(12) United States Patent
Chen et al.

(10) Patent No.: US 12,360,798 B2
(45) Date of Patent: *Jul. 15, 2025

(54) OFFLOADING PACKET PROCESSING PROGRAMS FROM VIRTUAL MACHINES TO A HYPERVISOR AND EFFICIENTLY EXECUTING THE OFFLOADED PACKET PROCESSING PROGRAMS

(71) Applicant: VMware LLC, Palo Alto, CA (US)

(72) Inventors: Bo Chen, Beijing (CN); Songtao Zheng, Beijing (CN); Shu Wu, Beijing (CN); Bingqing Shao, Beijing (CN); Yi Liao, Beijing (CN); Danqi Sun, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/745,825

(22) Filed: Jun. 17, 2024

(65) Prior Publication Data

US 2024/0338240 A1    Oct. 10, 2024

Related U.S. Application Data

(63) Continuation of application No. 16/971,243, filed as application No. PCT/CN2020/103168 on Jul. 21, 2020, now Pat. No. 12,014,197.

(51) Int. Cl.
*G06F 9/455*    (2018.01)

(52) U.S. Cl.
CPC .................. *G06F 9/45558* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,149,709 B2* | 4/2012 | Srinivasan | H04L 47/20 370/235 |
| 8,930,690 B2* | 1/2015 | Zuo | H04L 47/20 713/162 |
| 9,703,589 B2 | 7/2017 | Zheng | |
| 10,164,911 B2 | 12/2018 | Lakshmanan | |
| 10,581,636 B1 | 3/2020 | Skorodumov | |

(Continued)

OTHER PUBLICATIONS

Jorgensen et al.; "The express Data Path: Fast Programmable Packet Processing in the Operating System Kernel"; ACM ISBN 978-1-4503-6080-7/18/12; https://doi.org/10.1145/3281411.3281443; (Jorgensen_2018.pdf; pp. 54-66) (Year: 2018).*

(Continued)

*Primary Examiner* — Hiren P Patel (74) *Attorney, Agent, or Firm* — Quarles & Brady LLP (57) ABSTRACT

In one set of embodiments, a hypervisor of a host system can receive a packet processing program from a virtual network interface controller (NIC) driver of a virtual machine (VM) running on the hypervisor. The hypervisor can then attach the packet processing program to a first execution point in a physical NIC driver of the hypervisor and to a second execution point in a virtual NIC backend of the hypervisor, where the virtual NIC backend corresponds to a virtual NIC of the VM that originated the packet processing program.

18 Claims, 7 Drawing Sheets

(56) References Cited

U.S. PATENT DOCUMENTS

| | | | |
|---|---|---|---|
| 10,592,380 B2* | 3/2020 | Borello | G06F 21/57 |
| 10,616,099 B2 | 4/2020 | Tsirkin | |
| 10,623,372 B2* | 4/2020 | Wang | H04L 63/0227 |
| 10,657,095 B2 | 5/2020 | Srivastava | |
| 10,795,717 B2 | 10/2020 | Paul | |
| 10,904,167 B2* | 1/2021 | Tsirkin | G06F 9/45558 |
| 10,965,601 B2* | 3/2021 | Jiang | H04L 47/2441 |
| 11,283,699 B2 | 3/2022 | Chen | |
| 11,336,756 B2* | 5/2022 | Waskiewicz, Jr. | G06F 9/45558 |
| 12,014,197 B2* | 6/2024 | Chen | H04L 49/70 |
| 2005/0111454 A1* | 5/2005 | Narjala | H04L 12/56 370/395.5 |
| 2010/0257269 A1 | 10/2010 | Clark | |
| 2012/0005521 A1 | 1/2012 | Droux | |
| 2013/0254766 A1 | 9/2013 | Zuo | |
| 2015/0058847 A1 | 2/2015 | Zheng | |
| 2016/0253192 A1 | 9/2016 | Singaravelu | |
| 2018/0217858 A1 | 8/2018 | Moolenaar | |
| 2019/0068491 A1 | 2/2019 | Tsirkin | |
| 2019/0109714 A1 | 4/2019 | Clark | |
| 2019/0173841 A1 | 6/2019 | Wang | |
| 2020/0028785 A1 | 1/2020 | Ang | |
| 2020/0344182 A1 | 10/2020 | Tsirkin | |
| 2021/0064443 A1 | 3/2021 | Tsirkin | |
| 2021/0152642 A1 | 5/2021 | Ilan | |

OTHER PUBLICATIONS

Vieira, et al., "Fast Packet Processing with eBPF and XDP: Concepts, Code, Challenges, and Applications" ACM Computing Surveys, vol. 53, No. 1, Article 16. Publication date: Feb. 2020; (Vieira_2020.pdf; pp. 1-36) (Year: 2020).

Hohlfeld, et al., "Demystifying the Performance of XDP BPF" 2019 IEEE Conference on Network Softwarization (Hohlfeld_2019.pdf; pp. 208-212) (Year: 2019).

* cited by examiner

OFFLOADING PACKET PROCESSING PROGRAMS FROM VIRTUAL MACHINES TO A HYPERVISOR AND EFFICIENTLY EXECUTING THE OFFLOADED PACKET PROCESSING PROGRAMS

CROSS-REFERENCES TO RELATED APPLICATIONS

The present application is a continuation of U.S. patent application Ser. No. 16/971,243 filed on Aug. 19, 2020, which claims the benefit under 35 U.S.C 371 of International Application No. PCT/CN2020/103168 filed Jul. 21, 2020, entitled "OFFLOADING PACKET PROCESSING PROGRAMS FROM VIRTUAL MACHINES TO A HYPERVISOR AND EFFICIENTLY EXECUTING THE OFFLOADED PACKET PROCESSING PROGRAMS", the contents of which is incorporated herein by reference in its entirety.

BACKGROUND

Packet processing programs that run as user-space programs above the operating system (OS) kernel networking stack often fail to meet the high performance requirements of modern networking applications such load balancers, firewalls, distributed denial-of-service (DDoS) protection, and so on. One approach to improve the performance of such networking applications is Programmable In-Driver Packet Processing (PDPP). A PDPP-based networking application typically comprises a control plane program that runs in user space and a data plane program (i.e., packet processing program) that runs in kernel space. The packet processing program, which may be written in (or translated into) a bytecode such as extended Berkeley Packet Filter (eBPF), is provided by the control plane program to the OS kernel, where it is verified and just-in-time (JIT) complied into native machine code. The compiled packet processing program is then executed in the receive (RX) path of the OS kernel's network interface controller (NIC) driver on ingress network packets, at a point immediately following the receipt of such packets by the NIC driver via direct memory access (DMA).

Upon performing its processing on a given ingress network packet, the packet processing program outputs an action value indicating whether the packet should be dropped. transmitted/redirected to another destination, or received as normal. If the packet processing program determines that the packet should be received as normal, the packet is passed through the remainder of the NIC driver RX path (resulting in the allocation and initialization of kernel networking stack metadata for the packet) and is propagated up the OS kernel networking stack to user-level applications. However, if the packet processing program determines that the packet should be dropped or transmitted/redirected, the drop or transmit/redirect action is performed immediately at that point in the NIC driver RX path, thereby avoiding the costly overhead of (1) allocating and initializing the packet metadata, (2) propagating the packet once (in the case of drop) or twice (in the case of transmit) through the OS kernel networking stack, and (3) performing context switches between kernel mode and user mode. The elimination of this overhead allows PDPP-based networking applications to achieve a level of performance that is significantly higher than conventional, non-PDPP networking applications.

One limitation of PDPP as it exists today is that it cannot be effectively used in virtualized environments where the OS kernel is deployed as a guest kernel within a virtual machine (VM). This is because the packet processing program of a PDPP-based networking application running in such a VM will be executed at the VM's virtual NIC (vNIC) driver, rather than at the host system's physical NIC (pNIC) driver. As a result, all ingress network packets must traverse the host networking stack before they can reach and be processed by the packet processing program in the VM (i.e., guest), which negates the performance benefit of performing in-driver packet processing. A workaround for this problem is to assign the pNIC of the host system to the VM as a Peripheral Component Interconnect (PCI) passthrough device (in other words, a device that can be accessed by the VM at the physical driver level). However, this approach ties the VM to the host system and prevents other VMs from sharing use of the passthrough pNIC, which undesirably reduces the advantages of virtualization.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure is directed to techniques for (1) transparently offloading packet processing programs from VMs (or more precisely, from guest vNIC drivers) to the hypervisor on which those VMs run, and (2) efficiently executing the offloaded packet processing programs in the hypervisor. With respect to (1), the techniques include adding infrastructure in the hypervisor to accept, verify, and compile (as needed) the offloaded packet processing programs. With respect to (2), the techniques include (A) enabling multiple concurrent execution points in the hypervisor for each offloaded packet processing program (e.g., one in the host pNIC driver and another in host vNIC backends) and selecting the most appropriate/efficient execution point on a per-packet basis, and (B) efficiently identifying, at the host pNIC driver, which of potentially multiple offloaded packet processing programs (if any) to execute for a given ingress network packet. Taken together, these techniques enable PDPP to be employed in virtualized environments with a level of performance that is comparable to bare-metal environments, while retaining all of the benefits of virtualization (e.g., VM migration, dynamic hardware resource multiplexing, etc.).

2. Bare-Metal PDPP and Solution Architecture

Figure 1:
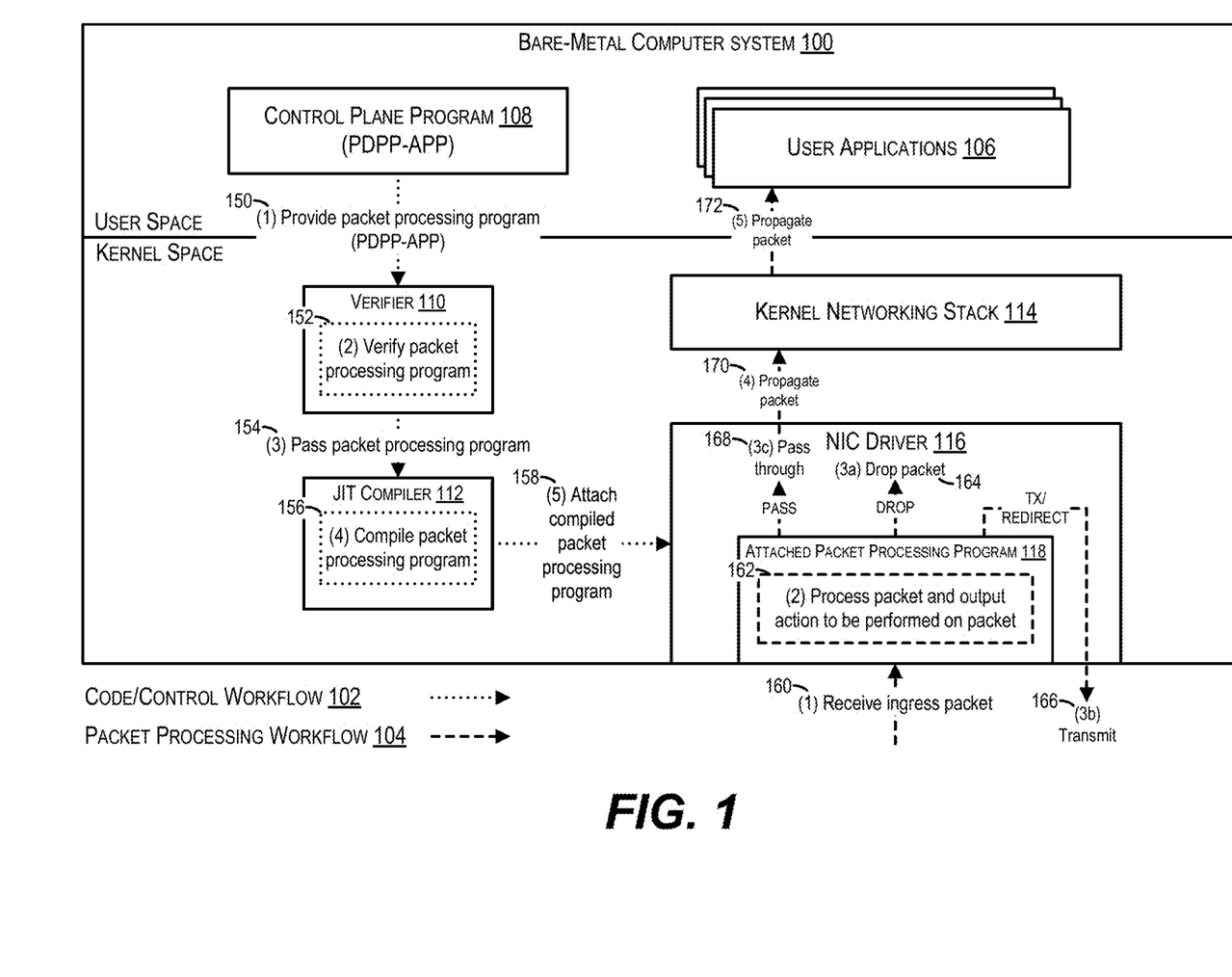
FIG. 1 depicts a bare-metal computer system that implements a PDPP-based networking application.

To provide context for the embodiments presented herein, FIG. 1 depicts a bare-metal (i.e., non-virtualized) computer system 100 running an OS kernel and two workflows-a code/control workflow 102 and a packet processing workflow 104—for implementing and executing an example PDPP-based networking application (referred to as "PDPP-APP") in this bare-metal environment. In one set of embodiments, the PDPP-based networking application may be an eXpress Data Path (XDP) networking application. In other embodiments, the PDPP-based networking application may be any other type of networking application that leverages the general concept of programmable in-driver packet processing as described in the present disclosure.

As shown, computer system 100 includes, within a user space representing a portion of system memory dedicated to user-level (i.e., non-kernel) processes, one or more user applications 106 and a control plane program 108 of PDPP-APP. Computer system 100 further includes, within a kernel space representing a portion of system memory dedicated to OS kernel processes, a verifier 110, a JIT compiler 112, a kernel networking stack 114, and a NIC driver 116. NIC driver 116 is communicatively coupled with a physical NIC of computer system 100 (not shown) that is configured to transmit and receive network packets to/from various remote systems and/or networks.

Starting with step (1) of code/control workflow 102 (reference numeral 150), control plane program 108 provides a packet processing program of PDPP-APP to the OS kernel for the purpose of attaching the packet processing program to, and thus executing the program in, NIC driver 116. At this stage, the packet processing program is assumed to be expressed in a bytecode such as eBPF.

At step (2) (reference numeral 152), the packet processing program is received by verifier 110 and the verifier analyzes the program's bytecode to ensure that it is safe to execute within the kernel. This analysis can include, e.g., verifying that the packet processing program will not crash the computer system or raise exceptions, will not pass out "secret" information, will only access a predefined subset of memory and other resources, and will terminate within a fixed number of instructions.

Assuming the verification at step (2) is successful, the packet processing program is passed to JIT compiler 112 (step (3); reference numeral 154). In response, JIT compiler 112 compiles the packet processing program from bytecode into machine code that is native to computer system 100, resulting in a compiled version (step (4); reference numeral 156).

Finally at step (5) (reference numeral 158), the compiled packet processing program is attached to an execution point in the RX path of NIC driver 116 that immediately follows the receipt of ingress network packets by NIC driver 116 from the physical NIC of computer system 100 via DMA. As used herein, an "execution point" is a point or location at which a packet processing program may be executed on (i.e., against) network packets, and "attaching" a packet processing program to an execution point causes the packet processing program to run at that execution point. By attaching packet processing program 118 to the execution point noted above in the RX path of NIC driver 116 at step (5), NIC driver 116 can execute program 118, as needed, on ingress network packets at that point in the RX path. Although not shown in code/control workflow 102, in some cases control plane program 108 may also create one or more map data structures in the kernel space (e.g., hash maps, array maps, etc.) that are accessible to both control plane program 108 and packet processing program 118. Upon being created, these map data structures may be manipulated by programs 108 and 118 to exchange control, accounting, and/or other information that is relevant to the operation of PDPP-APP, such as firewall rules, packet counters, and so on.

Turning now to packet processing workflow 104, at step (1) (reference numeral 160), an ingress network packet is received at NIC driver 116 and the packet data provided to packet processing program 118. In response, packet processing program 118 processes the packet in accordance with its internal logic and outputs an "action" value indicating whether the packet should be dropped (e.g., "DROP"), transmitted or redirected (e.g., "TX" or "REDIRECT"), or received as normal (e.g., "PASS") (step (2): reference numeral 162).

In the case of an action value of DROP, NIC driver 116 immediately drops the packet and thus recycles the RX buffer/queue occupied by that packet (step (3a); reference numeral 164). In the case of an action value of TX or REDIRECT, NIC driver 116 immediately transmits/forwards the packet, typically back out the physical NIC on which it was originally received (step (3b); reference numeral 166). Finally, in the case of an action value of PASS, NIC driver 116 passes the network packet through the remainder of its RX path (which includes, e.g., allocating and initializing kernel networking stack metadata for the packet) (step (3c); reference numeral 168). This in turn causes the packet to be propagated up kernel networking stack 114 and ultimately received by a user application 106 in user space (steps (4) and (5); reference numerals 170 and 172).

As noted in the Background section, because NIC driver 116 can immediately dispose of or handle ingress packets that packet processing program 118 has identified as drop or transmit/redirect targets without passing those packets further along its RX path or through kernel networking stack 114, PDPP-APP of FIG. 1 can achieve significantly higher performance than non-PDPP applications. However, this performance benefit is largely lost if the application is deployed in a virtualized, rather than bare-metal, environment.

Figure 2:
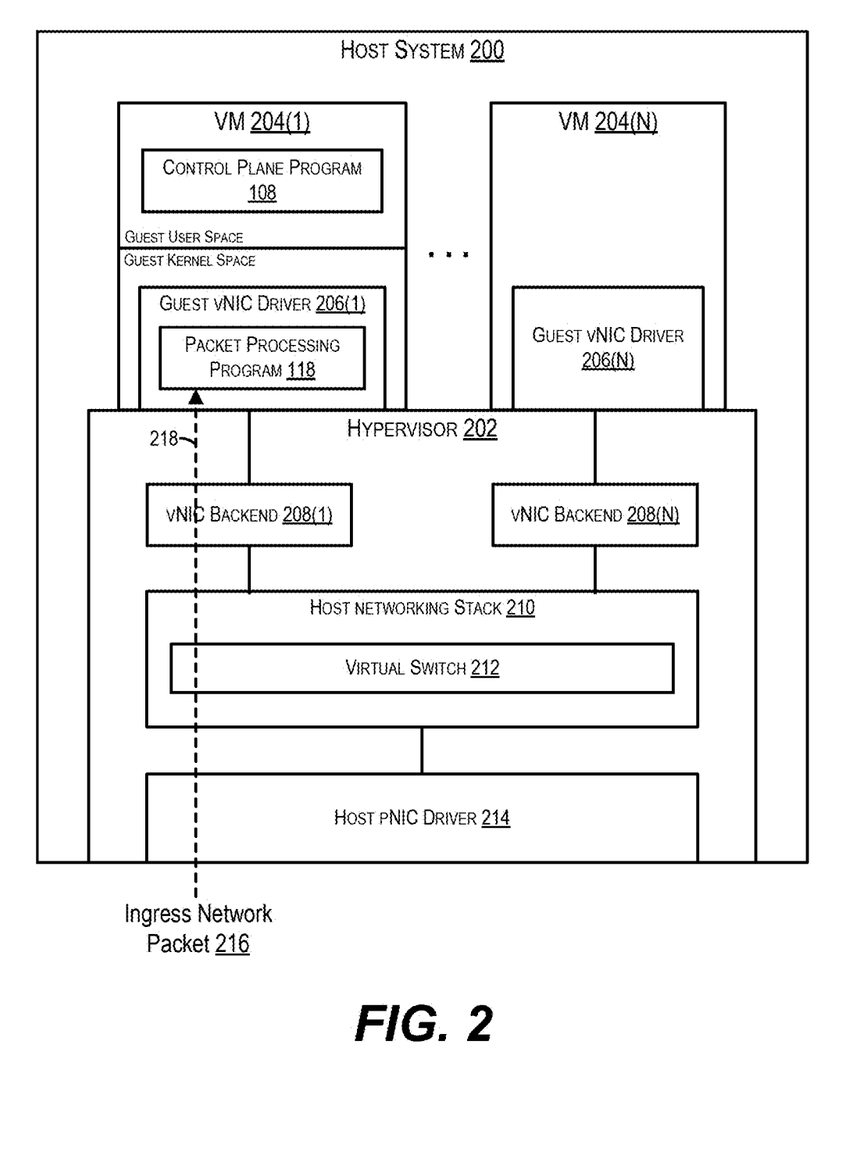
FIG. 2 depicts a host system that implements a PDPP-based application in a VM.

To clarify why this is the case, FIG. 2 depicts an example host system 200 that comprises a hypervisor 202 and a number of VMs 204(1)-(N) with respective guest vNIC drivers 206(1)-(N). In this example, VM 204(1) is assumed to be a virtualized version of computer system 100 of FIG. 1 and thus includes control plane program 108 of PDPP-APP in guest user space and packet processing program 118 of PDPP-APP (attached to guest vNIC driver 206(1)) in guest kernel space. In addition, hypervisor 202 includes a number of vNIC backends 208(1)-(N) that are communicatively coupled in a one-to-one manner to guest vNIC drivers 206(1)-(N), a host networking stack 210 (comprising a virtual switch (vSwitch) 212), and a host physical NIC (pNIC) driver 214. vNIC backends 208(1)-(N) can be understood as hypervisor representations of the virtual NICs that are accessed by VMs 204(1)-(N) via guest vNIC drivers 206(1)-(N) and thus the terms "vNIC backend" and "vNIC" are used interchangeably in the present disclosure. vSwitch 212 of host networking stack 210 can be understood as a software-based switch that provides connectivity between host pNIC driver 214 (which is connected to vSwitch 212 via an "uplink port"), vNIC backends 208(1)-(N) (which are connected to vSwitch 212 via "vNIC ports"), and potentially other components/ports of hypervisor 202.

As depicted in FIG. 2, at the time host system 200 receives an ingress network packet 216 at host pNIC driver 214 that is destined for VM 204(1) (and thus should be processed by packet processing program 118), the packet must traverse through host pNIC driver 214, host networking stack 210, and vNIC backend 208(1) before reaching packet processing program 118 at guest vNIC driver 206(1) (shown via arrow 218). This long and inefficient journey is necessary even if the packet is ultimately dropped by packet processing program 118. Further, in the case where packet processing program 118 determines that the packet should be transmitted or redirected, the packet must traverse back through that same path (in reverse) so that it can be sent out of host system 200 to an external destination. This results in very poor packet processing performance and defeats the purpose of in-driver packet processing.

One way to avoid the foregoing problem is to assign the pNIC of host pNIC driver 214 to VM 204(1) as a PCI passthrough device. This approach enables the guest OS kernel of VM 204(1) to exclusively control the pNIC and thus access it in a bare-metal fashion. However, as alluded to previously, PCI passthrough creates a dependency between the VM's state and the passthrough device state that prevents the VM from being live migrated to other host systems. In addition, because the VM takes exclusive control of the pNIC via PCI passthrough, the pNIC can no longer be shared with other VMs running on the same host system.

Another solution, which is the general focus of the present disclosure, is to offload packet processing program 118 from guest vNIC driver 206(1) of VM 204(1) to host pNIC driver 214 of hypervisor 202. However, a practical implementation of this idea faces a couple of challenges. First, there is currently no mechanism to specifically provide an packet processing program from a VM to a hypervisor so that the packet processing program can be run at the hypervisor level. Similarly, there is no mechanism to specifically communicate map-related commands from a VM to a hypervisor for manipulating (e.g., creating, deleting, accessing) map data structures that may be needed by an offloaded packet processing program in hypervisor kernel space. In some OS kernels such as Linux, hardware offload APIs have been introduced that facilitate the offloading of packet processing programs and map data structures from a VM to a hardware-based smartNIC; these offer some help but require additional infrastructure in the hypervisor to accept and properly process offloaded packet processing programs/map commands.

Second, although it is most efficient to offload packet processing program 118 from guest vNIC driver 206(1) to host pNIC driver 214 (as that is the earliest point in hypervisor 202 where ingress network packets can be examined), there are a number of relatively common scenarios in which executing the packet processing program solely at host pNIC driver 214 can cause issues. One such scenario is the case where host pNIC driver 214 receives a broadcast/multicast network packet P1 that is destined for vNIC backend 208(1) of VM 204(1) (which has attached packet processing program 118) as well as one or more other vNICs which do not have attached packet processing programs. In this scenario, the correct behavior is for packet processing program 118 to be executed on the copy of P1 that reaches vNIC backend 208(1) and not executed on the copies of P1 that reach the other vNICs. However, this is not possible if the sole execution point for packet processing program 118 is at host pNIC driver 214.

Another such scenario is the case where a network packet destined for vNIC backend 208(1) of VM 204(1) originates from a source within host system 200 (e.g., another VM), rather than from an external system. In this scenario, the packet will traverse through vSwitch 212 to reach vNIC backend 208(1) and completely bypass host pNIC driver 214 (including any packet processing program attached there).

Figure 3:
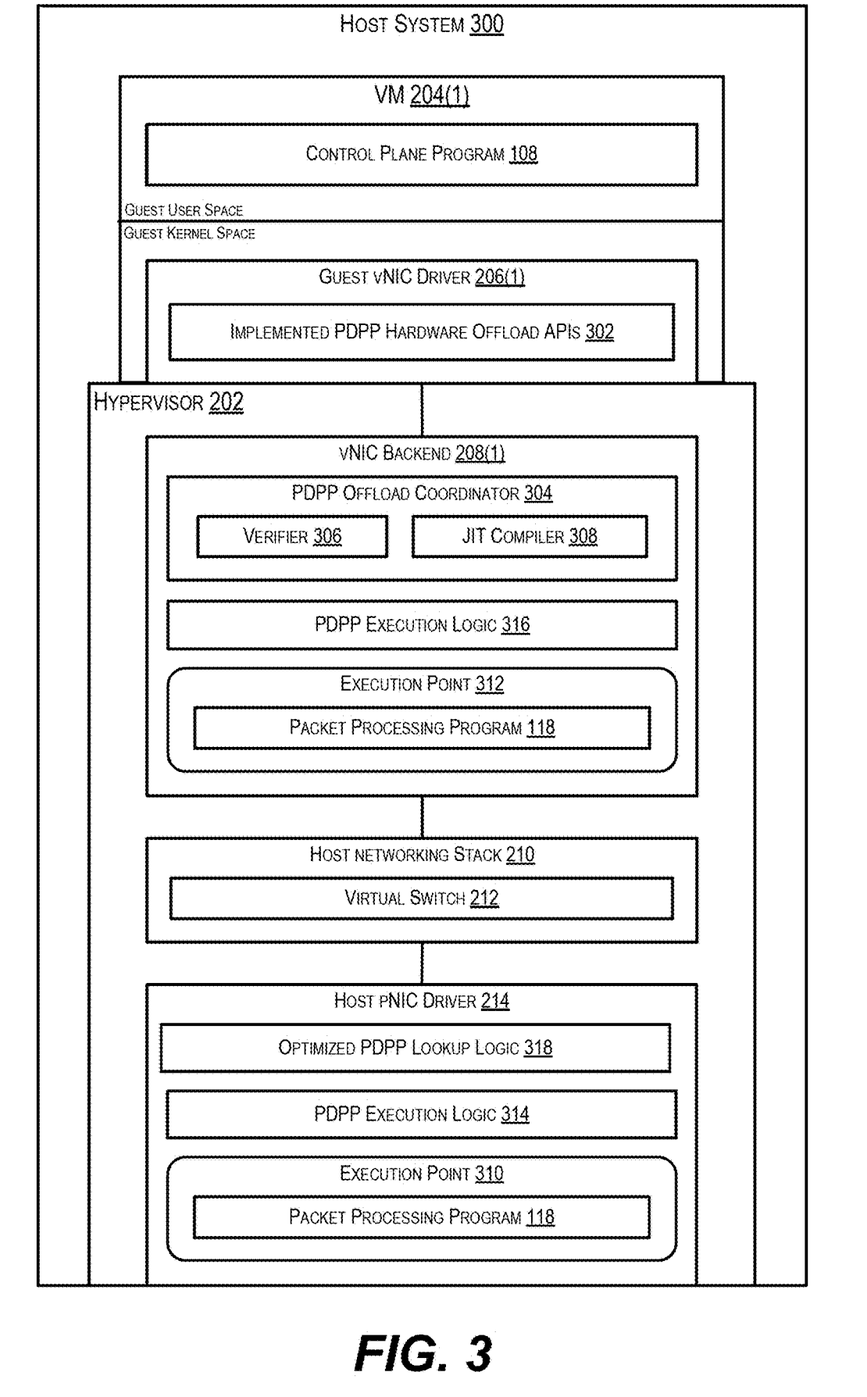
FIG. 3 depicts a host system architecture that supports transparent offloading of a packet processing program from a VM to a hypervisor and efficient execution of the offloaded packet processing program in the hypervisor according to certain embodiments.

To address the foregoing and other related issues, FIG. 3 depicts an enhanced version of host system 200 (i.e., host system 300) that (1) enables packet processing program 118 to be transparently offloaded from guest vNIC driver 206(1) of VM 204(1) to hypervisor 202, along with any map data structures that may be needed by the program, and (2) enables the offloaded packet processing program to be efficiently and correctly executed within hypervisor 202. In this figure, only the components related to VM 204(1) are shown for simplicity of illustration; however, one of ordinary skill in the art will appreciate that similar components may be implemented for other VMs and vNIC backends of the host system that have attached packet processing programs (referred to herein as "packet processing program-attached VMs/vNICs").

With respect to point (1) above, host system 300 includes an implementation of the hardware offload APIs mentioned earlier in guest vNIC driver 206(1) (reference numeral 302), as well as a new PDPP offload coordinator 304 comprising a hypervisor-level verifier 306 and JIT compiler 308 in vNIC backend 208(1). With these components in place, control plane program 108 can submit a packet processing program or map offload commands directed to the vNIC of VM 204(1) (which control plane program 108 believes is a physical NIC). In response, implemented hardware offload APIs 302 can cause guest vNIC driver 206(1) to pass the offload commands to PDPP offload coordinator 304. PDPP offload coordinator 304 can then process the commands in hypervisor 202, thereby actuating the offload of the specified packet processing program(s) and/or map(s) from the VM level to the hypervisor level. For example, assume control plane program 108 submits a command to offload packet processing program 118. In this case, guest vNIC driver 206(1) can pass (via implemented hardware offload APIs 302) the packet processing program in bytecode form to PDPP offload coordinator 304, and coordinator 304 can verify it (via verifier 306), compile it into native machine code (via JIT compiler 308), and attach it to appropriate execution points in hypervisor 202.

With respect to point (2) above, host system 300 specifically implements two separate execution points for packet processing program 118 within hypervisor 202—a first execution point 310 in host pNIC driver 214 and a second execution point 312 in vNIC backend 208(1). In addition, host system 300 includes new PDPP execution logic components 314 and 316 at these two locations that are configured to determine which execution point to use on ingress network packets on a per-packet basis. With this design, at the time of receiving an ingress network packet at host pNIC driver 214, driver 214 can check (using its corresponding PDPP execution logic 314) whether it is "safe" to run packet processing program 118 against the packet—in other words, whether the packet will only reach vNIC backend 208(1) and no other destination. If the answer is yes, host pNIC driver 214 can run packet processing program 118 via execution point 310 and, if the packet is passed onward, mark the packet with an indicator (e.g., an "APPLIED" flag) indicating that packet processing program 118 has been run against the packet. On the other hand, if the answer is no, host pNIC driver 214 can simply pass the packet as normal (without setting the APPLIED flag).

Then, at the time the packet reaches vNIC backend 208(1), vNIC backend 208(1) can check (via its corresponding PDPP execution logic 316) whether the indicator on the packet is set/present. If the answer is yes, vNIC backend 208(1) can conclude that packet processing program 118 was previously run against the packet and thus pass the packet to guest vNIC driver 206(1). However if the answer is no, vNIC backend 208(1) can conclude that packet processing program 118 has not yet been run against the packet and thus can execute the program via execution point 312. This achieves two goals: first, it ensures packet processing program 118 is run at pNIC driver 214 whenever possible to maximize efficiency, while avoiding scenarios where running the program at driver 214 may cause errors/issues. Second, it ensures the packet processing program 118 is always executed exactly once against packets destined for vNIC backend 208(1), despite the presence of two separate execution points 310 and 312.

In addition to all of the above, host system 300 includes an optimized PDPP lookup logic component 318 in host pNIC driver 214 that leverages hardware multi-queuing functionality found in most modern server-grade NICs. As described in section (5) below, at the time host pNIC driver 214 receives an ingress network packet, driver 214 can use optimized PDPP lookup logic 318—which assumes that the hardware RX queues of the pNIC corresponding to driver 214 are configured in a certain way—to quickly and efficiently identify which (if any) of the packet processing programs attached to host pNIC driver 214 should be executed against the packet.

The remaining sections of the present disclosure provide additional details regarding the operation of components 302-318 for enabling the offload and execution of packet processing program 118 from VM 204(1) to hypervisor 202 according to various embodiments. It should be appreciated that FIGS. 1-3 are illustrative and not intended to limit embodiments of the present disclosure. For example, although FIG. 3 depicts a particular arrangement of components with host system 300, other arrangements are possible (e.g., the functionality attributed to a particular component may be split into multiple components, components may be combined, etc.) and each component may include sub-components or implement functions that are not specifically described. One of ordinary skill in the art will recognize other variations, modifications, and alternatives.

3. Packet Processing Program Offloading

Figure 4:
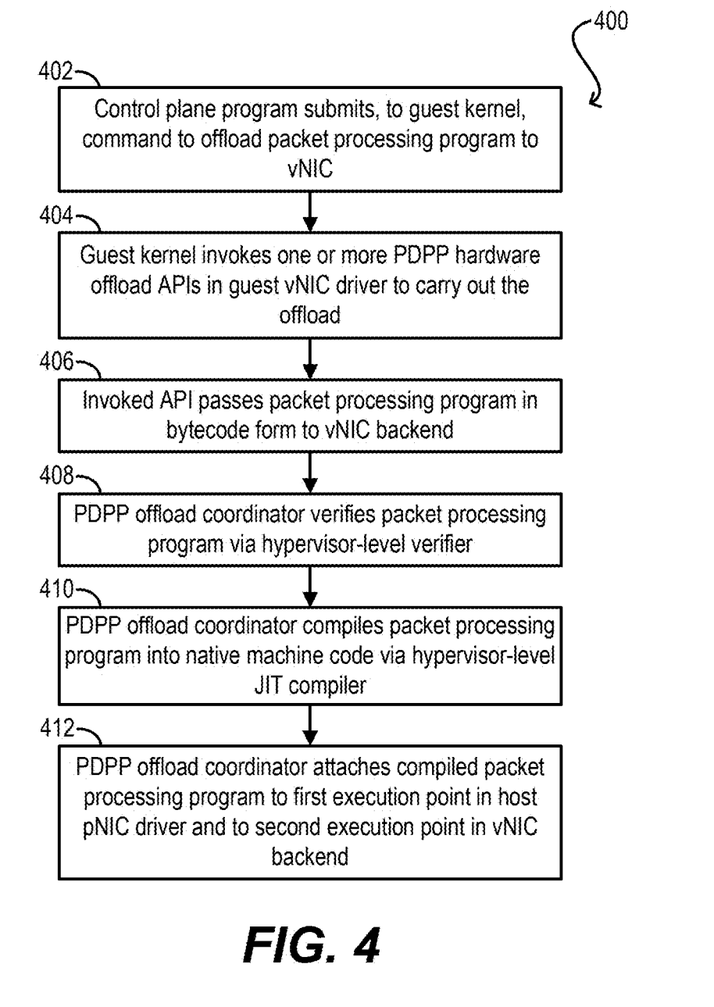
FIG. 4 depicts a flowchart for offloading a packet processing program from a VM to a hypervisor according to certain embodiments.

FIG. 4 depicts a flowchart 400 that may be executed by control plane program 108, guest vNIC driver 206(1) (with hardware offload APIs 302), and PDPP offload coordinator 304 (with verifier 306 and JIT compiler 308) of FIG. 3 for offloading packet processing program 118 from VM 204(1) to hypervisor 202 according to certain embodiments. Flowchart 400 assumes that PDPP offload coordinator 304 is aware of the dual execution point design discussed in section (2) above and thus is configured to attach packet processing program 118 to the two execution points in pNIC driver 214 and vNIC backend 208(1) respectively (i.e., 310 and 312).

Starting with block 402, control plane program 108 can submit, to the guest OS kernel of VM 204(1), a command to offload packet processing program 118 to the VM's vNIC (i.e., vNIC backend 208(1)). In response, the guest kernel can invoke one or more of hardware offload APIs 302 implemented in guest vNIC driver 206(1) for carrying out the offload (block 404) and the invoked API can pass packet processing program 118, in its bytecode form, to PDPP offload coordinator 304 in vNIC backend 208(1) (block 406).

At block 408, PDPP offload coordinator 304 can receive packet processing program 118 and verify, using verifier 306, that the program is safe to execute in hypervisor 202. As mentioned previously, this verification can include confirming, inter alia, that the packet processing program will not crash host system 300 or raise exceptions, will not pass out "secret" information, will only access a predefined subset of memory and other resources, and will terminate within a fixed number of instructions. PDPP offload coordinator 304 can then compile, using JIT compiler 308, packet processing program 118 into native machine code (e.g., x86 instruction code, ARM instruction code, etc.) that can be natively run on the CPU(s) of host system 300 (block 410).

Finally, at block 412, PDPP offload coordinator 304 can attach the compiled version of packet processing program 118 to execution point 310 located at host pNIC driver 214 and to execution point 312 located at vNIC backend 208(1), thereby enabling program 118 to be run on ingress network packets at these two locations. Although not shown, as part of the attachment performed at block 412 PDPP offload coordinator 302 can instruct host pNIC driver 214 to update an internal hash table with a new hash table entry comprising the destination address (e.g., destination MAC address) of vNIC backend 208(1) as the entry key and an identifier of packet processing program 118 as the entry value. As discussed in the next section, host pNIC driver 214 can use this hash table to determine which packet processing program has been attached to vNIC backend 208(1) at the time of receiving and processing an incoming packet.

It should be appreciated that workflow 400 is illustrative and various modifications are possible. For example, although workflow 400 assumes that PDPP offload coordinator 304 verifies and compiles packet processing program 118 at blocks 408 and 410, in certain embodiments these steps may be omitted. For example, in some embodiments packet processing program 118 may be a trusted program and thus PDPP offload coordinator 304 may determine that no verification is needed. In further embodiments, packet processing program 118 may already be expressed in a format that is directly executable by host system 300 (rather than in a bytecode) and thus PDPP offload coordinator 304 can omit the compilation performed via compiler 308 at block 410.

4. Packet Handling at Host pNIC Driver and vNIC Backend

Figure 5:
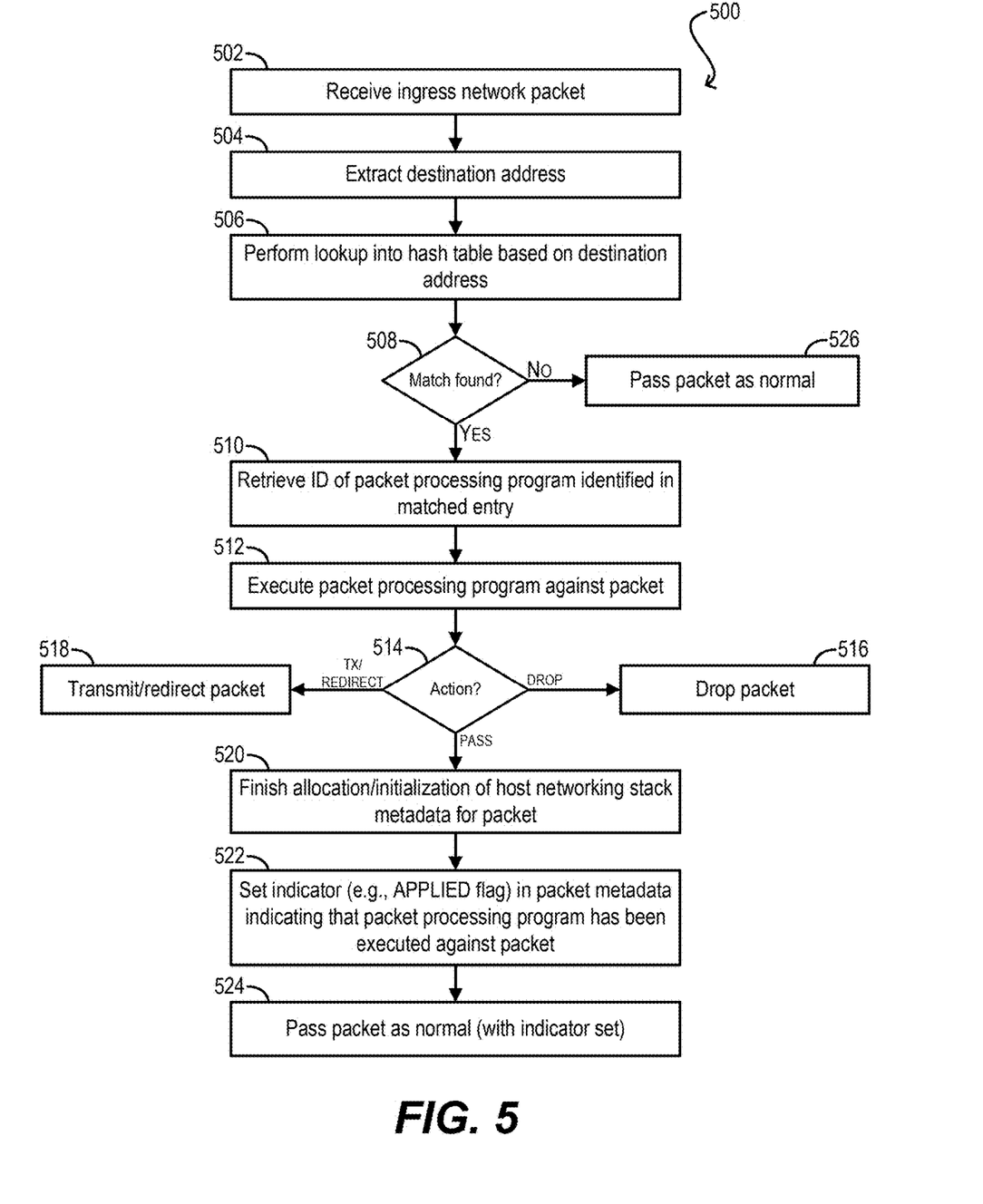
FIG. 5 depicts a flowchart for handling an ingress network packet at a host pNIC driver according to certain embodiments.
Figure 6:
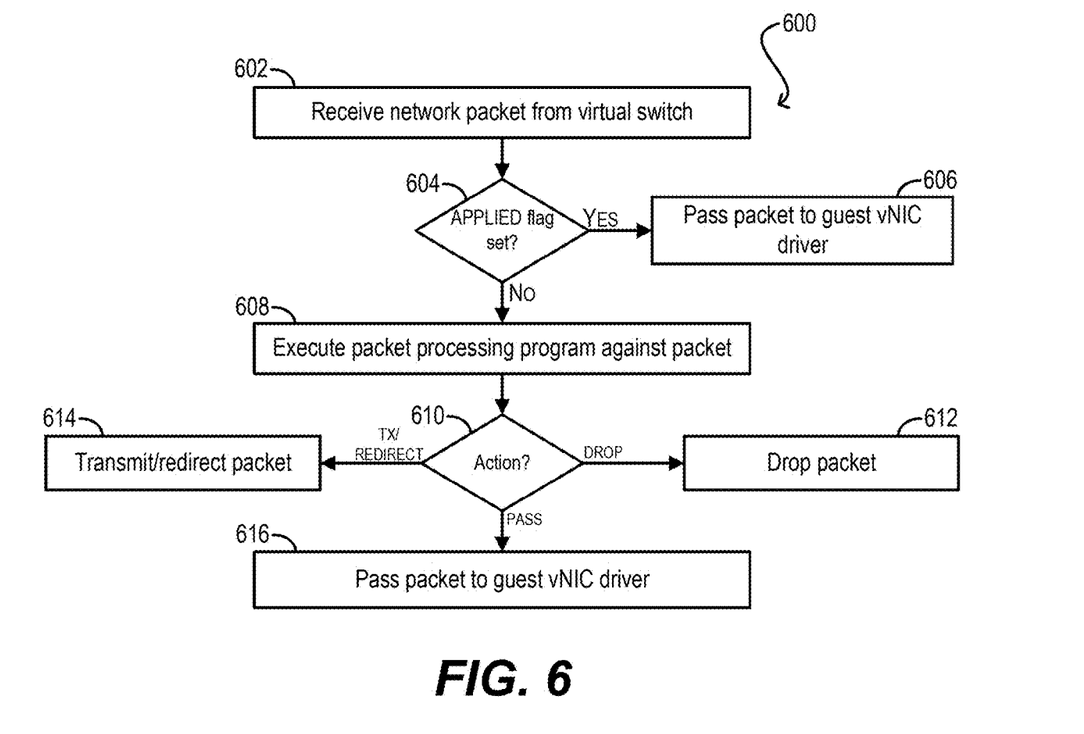
FIG. 6 depicts a flowchart for handling an ingress network packet at a vNIC backend according to certain embodiments.

FIGS. 5 and 6 depict flowcharts 500 and 600 that may be executed by host pNIC driver 214 and vNIC backend 208(1) respectively for handling an ingress network packet and determining, via their associated PDPP execution logic components 314 and 316, whether the packet should be processed via an attached packet processing program according to certain embodiments. Flowchart 500 assumes that the various vNIC backends of host system 300 are connected via vSwitch 212 according to a simple Layer 2 network and thus each vNIC backend can be uniquely identified by a destination MAC address. However, one of ordinary skill in the art will appreciate that the operation of flowchart 500 can be modified to support more complex network topologies (e.g., overlay networks, etc.).

Starting with blocks 502 and 504 of flowchart 500, host pNIC driver 214 can receive an ingress network packet from the pNIC of host system 300 via DMA and can extract the destination address (e.g., destination MAC address) included in the packet header.

At block 506, host pNIC driver 214 can perform a lookup into the hash table mentioned above using the destination address to determine whether a packet processing program has been attached to the vNIC backend corresponding to the address. If the lookup returns a match (block 508), host pNIC driver 214 can retrieve the ID of the packet processing program included in the matched hash table entry (block 510) and cause the packet processing program to process the packet (block 512). Host pNIC driver 214 can then check whether the action value output by the executed program is DROP (indicating that the packet should be dropped), TX or REDIRECT (indicating that the packet should be transmitted/redirected), or PASS (indicating that the packet should be passed as normal) (block 514).

In the case of DROP, host pNIC driver 214 can immediately drop the packet (e.g., recycle the RX buffer/queue holding the packet) (block 516).

In the case of TX or REDIRECT, host pNIC driver 214 can immediately transmit/redirect the packet to its new destination (block 518).

In the case of PASS, host pNIC driver 214 can finish allocation/initialization of the host networking stack metadata for the packet (block 520) and set an indicator (e.g., the previously mentioned APPLIED flag) in the packet metadata indicating that the packet processing program has been run against the packet (block 522). Host pNIC driver 214 can then pass the packet as normal through host networking stack 210 (block 524).

Finally, if no hash table match is found at block 508, host pNIC driver 214 can conclude that the destination address does not identify a packet processing program-attached vNIC (or alternatively the destination address is a broadcast or multicast address that may potentially reach multiple destinations). As a result, host pNIC driver 214 can pass the packet as normal without marking the packet with the APPLIED flag (block 526). It should be noted that the processing performed by host pNIC driver 214 in workflow 500 to determine whether to execute a packet processing program against the packet (and thus whether the packet will only reach a single packet processing program-attached vNIC) is a "best effort" determination, because it does not includes the more complex processing conventionally performed by, e.g., vSwitch 212 to identify the exact destination (s) of the packet.

Turning now to flowchart 600 of FIG. 6, at block 602 vNIC backend 208(1) can receive a network packet from vSwitch 212 and check whether the packet's metadata is marked with (i.e., includes a set value for) the APPLIED flag (block 604). If the answer is yes, vNIC backend 208(1) can pass the packet to guest vNIC driver 206(1) of VM 204(1) (block 606).

However, if the answer is no, vNIC backend 208(1) execute its attached packet processing program (i.e., packet processing program 118) against the packet (block 608) and check the action value returned by the program (block 610).

If the value is DROP, vNIC backend 208(1) can drop the packet (block 612).

Alternatively, if the value is TX or REDIRECT, vNIC backend 208(1) can transmit/forward the packet to its new destination (block 614).

Finally, if the value is PASS, vNIC backend 208(1) can pass the packet to guest vNIC driver 206(1) of VM 204(1) (block 616).

5. Packet Handling at Host pNIC Driver Using Hardware Multi-Queuing Optimization As noted in section (2) above, in certain embodiments host pNIC driver 214 can leverage, via optimized PDPP lookup logic component 318, the hardware multi-queuing capability implemented in many modern server-grade pNICs to more quickly and efficiently identify which attached packet processing program (if any) to apply to a given network packet as part of its RX path. This optimization takes advantage of the fact that hardware multi-queuing enables a pNIC to segregate the ingress network traffic it receives into multiple hardware RX queues based on per-queue RX filters. For example, all incoming network packets matching RX filter A can be automatically placed in RX queue A, all incoming network packets matching RX filter B can be automatically placed in RX queue B, and so on.

Because host pNIC driver 214 determines the attached packet processing program that should run for a given packet based on the packet's destination address (which in turn identifies the address of the vNIC backend that will receive the packet), host pNIC driver 214 can configure the RX filters of the pNIC such that the ingress network traffic destined for each packet processing program-attached vNIC is segregated into its own hardware RX queue. For instance, all traffic destined for vNIC backend 208(1) can be placed (via an RX filter identifying the address of vNIC backend 208(1)) into RX queue A, all traffic destined for vNIC backend 208(2) can be placed (via an RX filter identifying the address of backend 208(2)) into RX queue B, etc. Further, host pNIC driver 214 can designate one or more RX queues as "non-PDPP" queues (i.e., queues that do not hold any packets destined for packet processing program-attached vNICs) and can configure the RX filters of these non-PDPP queues to specifically exclude the addresses of packet processing program-attached vNICs.

With foregoing configuration in place, two benefits are achieved: first, if host pNIC driver 214 receives an ingress packet in an RX queue that it knows is assigned/mapped to an packet processing program-attached vNIC, the driver can simply retrieve the packet processing program attached to that particular vNIC and run the program, without having to perform a lookup into a hash table comprising multiple address->packet processing program mappings. Second, if host pNIC driver 214 receives an ingress packet in an RX queue that it knows is not assigned/mapped to a packet processing program-attached vNIC (i.e., one of the "non-PDPP" RX queues), host pNIC driver 214 can immediately conclude that no packet processing program needs to be run against the packet, without performing any lookup or data retrieval at all. Accordingly, this optimization can result in a noticeable increase in efficiency, particularly if there are a large number of different packet processing programs attached to host pNIC driver 214.

Figure 7:
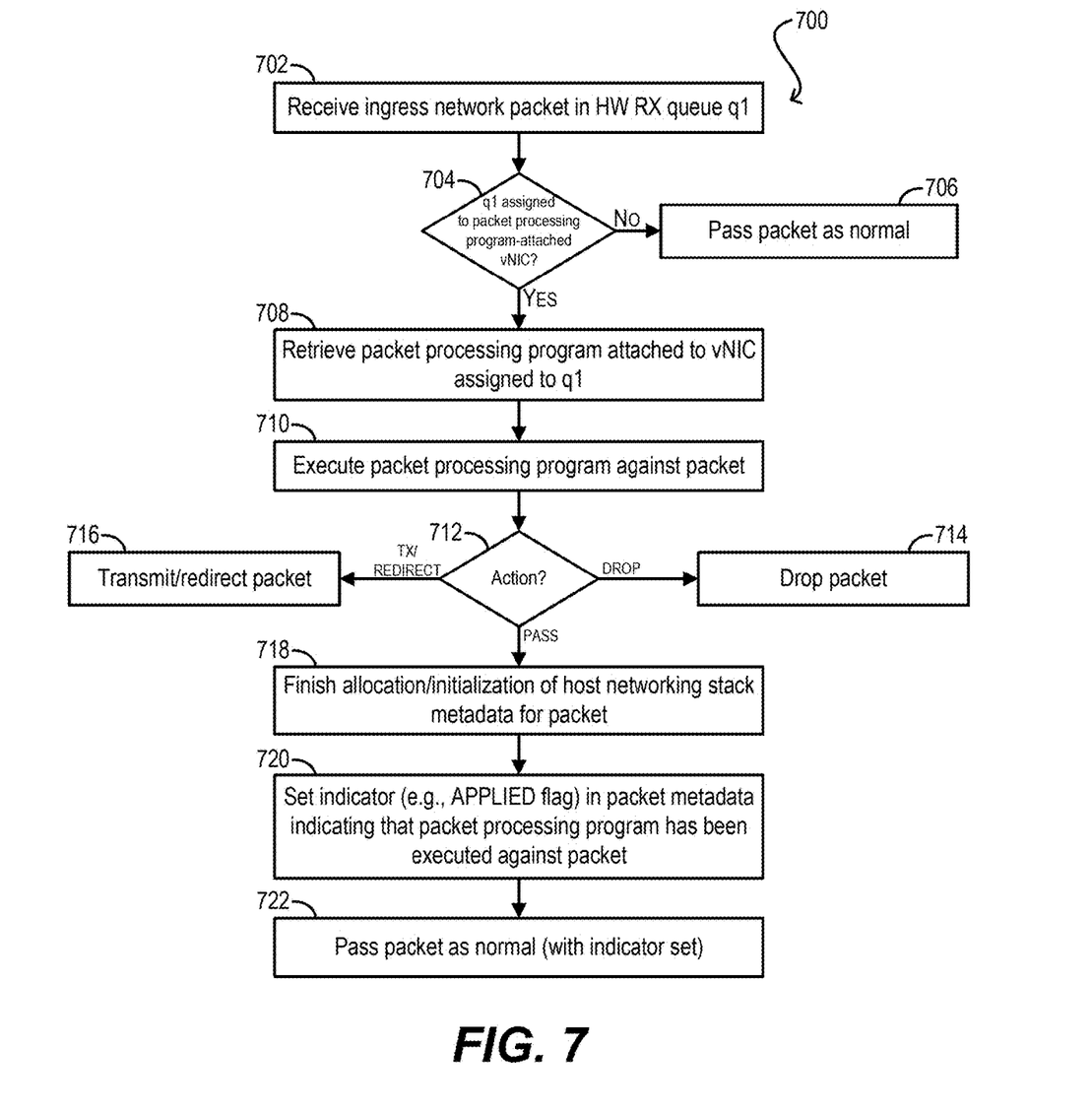
FIG. 7 depicts a flowchart for handling an ingress network packet at a host pNIC driver using a hardware multi-queuing optimization according to certain embodiments.

FIG. 7 depicts a flowchart 700 that can be performed by host pNIC driver 214 for handling an ingress network packet and determining whether the packet should be processed via an attached packet processing program, per the hardware multi-queuing optimization explained above according to certain embodiments. Flowchart 700 assumes that each packet processing program-attached vNIC of host system 300 is assigned to its own RX queue, such that all traffic destined for that vNIC will be placed in its assigned queue. Flowchart 700 further assumes that vNICs and other ports of host system 300 that are not attached to a packet processing program are assigned to a separate non-PDPP RX queue.

Starting with blocks 702 and 704, host pNIC driver 214 can receive an ingress network packet from the pNIC of host system 300 in a hardware RX queue q1 and can check whether q1 is assigned/mapped to a packet processing program-attached vNIC. If the answer is no, host pNIC driver 214 can pass the packet as normal (block 706).

On the other hand, if the answer at block 704 is yes, host pNIC driver 214 can retrieve the packet processing program attached to the vNIC assigned to q1 (block 708) and can execute the packet processing program against the packet (block 710). Finally, host pNIC driver 214 can take an appropriate action based on the action value output by the executed packet processing program, in a manner that is substantially similar to blocks 514-524 of FIG. 5 (block 712-722).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s).

In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A host system comprising:
a processor;
a storage medium comprising instructions executable by the processor; and
a network interface card (NIC), the NIC being configured to receive an ingress packet and extract a destination address from the ingress packet;
wherein the processor is configured to execute the instructions to:
instantiate a hypervisor running a virtual machine (VM), the VM comprising a virtual NIC driver, the hypervisor comprising a physical NIC driver associated with the NIC;
configure a packet processing program from the virtual NIC driver;
attach the packet processing program to a first execution point in the physical NIC driver;
attach the packet processing program to a second execution point in a virtual NIC backend of the hypervisor; and
select between the first execution point and the second execution point;
wherein the physical NIC driver is configured to:
determine whether the destination address is associated with the packet processing program or any other packet processing program attached to the first execution point, and
execute the packet processing program against the ingress network packet and to allocate hypervisor networking stack metadata for the ingress network packet.

2. The host system of claim 1, wherein the virtual NIC backend corresponds to the virtual NIC driver originated from the packet processing program.

3. The host system of claim 1, wherein the packet processing program is expressed in a bytecode.

4. The host system of claim 1, wherein the packet processing program is verified and compiled by the hypervisor prior to being attached to the first and second execution points.

5. The host system of claim 1, wherein the virtual NIC backend is configured to receive a network packet from a networking stack of the hypervisor, the network packet including hypervisor networking stack metadata, and to determine whether the hypervisor networking stack metadata includes an indication that the packet processing program was previously executed against the network packet at the first execution point.

6. The host system of claim 5, wherein if the hypervisor networking stack metadata does not include the indication, the virtual NIC backend is configured to execute the packet processing program against the network packet.

7. A method comprising:
instantiating a hypervisor running a virtual machine (VM), the VM comprising a virtual network interface card (NIC) driver, the hypervisor comprising a physical NIC driver associated with the NIC;
configuring a packet processing program from the virtual NIC driver;
receiving an ingress packet by a physical;
extracting a destination address from the ingress packet;
attaching the packet processing program to a first execution point in the physical NIC driver;
attaching the packet processing program to a second execution point in a virtual NIC backend of the hypervisor; and
selecting between the first execution point and the second execution point based at least on the destination address
wherein the physical NIC driver is configured to:
  determine whether the destination address is associated with the packet processing program or any other packet processing program attached to the first execution point, and
  execute the packet processing program against the ingress network packet and to allocate hypervisor networking stack metadata for the ingress network packet.

8. The method of claim 7, further comprising executing the packet processing program against the ingress network packet by the physical NIC driver.

9. The method of claim 8, further comprising allocating hypervisor networking stack metadata for the ingress network packet.

10. The method of claim 9, further comprising including an indication in the hypervisor networking stack metadata that the packet processing program has been executed against the ingress network packet.

11. The method of claim 7, further comprising determining, by the physical NIC driver, whether the ingress network packet was received by a physical NIC in a hardware RX queue that is mapped to a packet processing program-attached virtual NIC backend, the hardware RX queue being associated with an RX filter that causes the physical NIC to automatically place all ingress traffic destined for the packet processing program-attached virtual NIC backend into the hardware RX queue.

12. A method comprising:
instantiating a hypervisor running a virtual machine (VM), the VM comprising a virtual network interface card (NIC) driver, the hypervisor comprising a physical NIC driver associated with the NIC;
configuring a packet processing program from the virtual NIC driver;
receiving a network packet from a networking stack of the hypervisor, the network packet including hypervisor networking stack metadata;
attaching the packet processing program to a first execution point in the physical NIC driver;
attaching the packet processing program to a second execution point in a virtual NIC backend of the hypervisor; and
selecting between the first execution point and the second execution point based at least on the hypervisor networking stack metadata;
wherein the physical NIC driver is configured to:
  determine whether the destination address is associated with the packet processing program or any other packet processing program attached to the first execution point, and
  execute the packet processing program against the ingress network packet and to allocate hypervisor networking stack metadata for the ingress network packet.

13. The method of claim 12, further comprising determining whether the hypervisor networking stack metadata includes an indication that the packet processing program was previously executed against the network packet at the first execution point.

14. The method of claim 13, further comprising if the hypervisor networking stack metadata does not include the indication, executing, by the virtual NIC backend, the packet processing program against the network packet.

15. The method of claim 12, wherein the first execution point is located in a receive path (RX) of the physical NIC driver that receives and handles ingress network packets.

16. The method of claim 12, wherein the packet processing program is expressed in a bytecode.

17. The method of claim 12, wherein the packet processing program is verified and compiled by the hypervisor prior to being attached to the first and second execution points.

18. The method of claim 12, wherein the hypervisor is configured to determine an optimal execution point for the packet processing program between the physical NIC driver and the virtual NIC backend.

* * * * *